(12) United States Patent
Gallant et al.

(10) Patent No.: US 7,327,239 B2
(45) Date of Patent: Feb. 5, 2008

(54) HEADS-UP SPEED DISPLAY FOR VEHICLES

(75) Inventors: David Gallant, Newfield, ME (US); Randy Oliver, Limerick, ME (US)

(73) Assignee: InVision Systems, LLC, Portland, ME (US)

( * ) Notice: Subject to any disclaimer, the term of this patent is extended or adjusted under 35 U.S.C. 154(b) by 250 days.

(21) Appl. No.: 11/197,967

(22) Filed: Aug. 5, 2005

(65) Prior Publication Data

US 2006/0028330 A1    Feb. 9, 2006

Related U.S. Application Data

(60) Provisional application No. 60/599,451, filed on Aug. 6, 2004.

(51) Int. Cl.
*B60Q 1/00* (2006.01)

(52) U.S. Cl. ............ 340/438; 340/984; 340/441; 116/37; 345/7; 345/8; 359/630

(58) Field of Classification Search ........... 340/438, 340/936, 984, 432, 439, 441; 116/35 R, 116/36, 37, 38, 57, 62.1; 345/7, 8; 359/630
See application file for complete search history.

(56) References Cited

U.S. PATENT DOCUMENTS

| | | | |
|---|---|---|---|
| 3,125,985 A | 3/1964 | Nallinger | |
| 3,317,906 A | 5/1967 | Baldridge | |
| 4,109,235 A | 8/1978 | Bouthors | |
| 4,688,029 A | 8/1987 | Kawasaki et al. | |
| 4,988,976 A * | 1/1991 | Lu | 340/461 |
| 4,990,899 A * | 2/1991 | Gerlitz et al. | 345/7 |
| 5,321,415 A | 6/1994 | Mount | |
| 5,469,184 A | 11/1995 | Mount | |
| 5,576,687 A | 11/1996 | Blank et al. | |
| 5,828,585 A * | 10/1998 | Welk et al. | 702/96 |
| 5,969,969 A * | 10/1999 | Ejiri et al. | 701/41 |
| 6,067,492 A * | 5/2000 | Tabata et al. | 701/51 |
| 6,724,538 B2 * | 4/2004 | Kushida et al. | 359/630 |

* cited by examiner

*Primary Examiner*—Daryl C Pope
(74) *Attorney, Agent, or Firm*—Greenberg Traurig, LLP

(57) ABSTRACT

A heads-up speed sensing display and control system for apprising an operator of the risk of operating a vehicle at various speeds has a risk indicator display with a plurality of illuminable elements, such as three different colored LEDs, illuminable in a plurality of patterns, each of the plurality of patterns having a predetermined correlation to vehicle speed, such as green for safe, yellow for caution and red for hazardous. A speed sensor, such as a Hall-effect device is coupled to a driven element of the vehicle, like a speedometer cable, and causes the speed sensor to generate a signal indicative of vehicle speed. A control unit receives the speed signal and selects an illumination pattern to indicate the risk of operation at the speed the vehicle is then traveling. The display may be wired or wireless and be attached to a windshield, face guard or helmet. The display system may be customizable to the operator and the environmental conditions and may be coordinated with a signage system using the same risk indicator conventions. The indicator system may also be used as a governor. In yet another embodiment, GPS data is used in a lookup table to ascertain the speed limit for the operation of the vehicle at any given time and place. The speed limit information is used to inform a governor which reduces vehicle speed to the ascertained limit. The ascertained speed limit may be used to select a risk indicator pattern for the actual operating speed of the device.

9 Claims, 6 Drawing Sheets

HEADS-UP SPEED DISPLAY FOR VEHICLES

CROSS REFERENCE TO RELATED APPLICATIONS

This application claims the benefit of U.S. Provisional Application Ser. No. 60/599,451 entitled, Heads-Up Speed Display For Vehicles, filed Aug. 6, 2004.

FIELD OF THE INVENTION

The present invention relates to speed indicators for moving vehicles and more particularly, to speed indicators provided proximate to a driver's forward looking line of sight.

BACKGROUND OF THE INVENTION

Various speed indicators have been proposed to effectively provide a driver of a vehicle with speed information. These known speed indicators would include various "heads-up" displays, the basic concept of which is to provide the speed indicator display at a position close to the driver's line of sight as the driver looks forward towards the direction of travel, e.g., when the driver of an automobile is looking at the road and traffic in front of a forward moving vehicle. Many of the heads-up displays proposed are directed at applications on automobiles and airplanes.

The operation of snowmobiles, jet skis, ATV's (all terrain vehicles) and motorcycles, in particular, trail bikes, present additional and different conditions for monitoring speed than those presented by automobiles and airplanes. Water and off-road conditions can be expected to vary more rapidly and severely than the conditions of a paved road or the open sky. For example, a fallen tree or boulder may impede the course of a trail bike. A snowmobile may encounter deep powder, ice or a patch of mud, depending upon the place where it is operated, the season, etc. Similarly, partially submerged tree limbs, barrels, rope, etc. may constitute an unexpected obstacle to a jet ski. As a result, it is imperative for operators of off-road vehicles to be highly vigilant for any obstructions or changes in the surface in the path of their vehicle. This vigilance makes it more desirable that the driver look forward at all times, rather than looking down at a speedometer. The degree of surface roughness encountered in off-road travel frequently makes it difficult or impossible for the operator of a jet ski, snowmobile or trail bike to read a speedometer due to the driver's and the vehicle's relative movement. Because off-road vehicles like jet skis, trail bikes and snowmobiles typically do not have closed cabs, weather conditions such as rain, snow, icing, fogging, may also act to reduce or eliminate the driver's capacity to visualize a speedometer. Since the environment in which an off-road vehicle is operated may vary widely, and some environments provide a distorted and/or different perception of speed (e.g., travel over a frozen lake will provide a different sense of the speed of a snowmobile than travel through the wood), operators of off-road vehicles can not rely solely on their innate perception of speed and should utilize an objective measure of speed, such as a speedometer.

The factors of trail difficulty, driver expertise and weather conditions all contribute to ascertaining the speed at which a particular trail may be traveled in safety. If the operator of an off-road vehicle, such as a snowmobile, exceeds a safe speed range for the particular combination of skill level, trail and weather conditions, accidents and injuries can result. Accordingly, an effective system for apprising operators of off-road vehicles of speed related risk associated with operating their vehicle while allowing them to focus on the landscape in front of them is highly desirable.

SUMMARY

The limitations of prior art speed indicators are addressed by the present invention, which includes a visual indicator for apprising an operator of a vehicle of the level of risk associated with operating the vehicle at a given speed. The visual indicator includes a plurality of illuminable elements illuminable in a plurality of patterns. The patterns have a predetermined correlation to safety of operation at a given vehicle speed. The visual indicator receives a signal indicative of vehicle speed and displays one of the plurality of illuminable patterns in response to the signal. The visual indicator is positionable proximate to the operator's line of sight while the operator is operating the vehicle and is visible to the operator when the operator is looking at a spatial position towards which the vehicle is traveling.

In accordance with a method of the present invention, a plurality of speed limits associated with a plurality of geographic positions are stored in a computer-accessible memory. The geographic position of the vehicle is ascertained using a GPS receiver and the speed limit for the geographic position of the vehicle stored in memory is accessed by a computer by looking up the speed limit for the applicable geographic position. The actual speed of the vehicle is sensed with a speed sensor and compared to the ascertained speed limit. If the actual speed of the vehicle exceeds the ascertained speed limit, then engine power output is reduced until the speed of the vehicle is less than or equal to the ascertained speed limit.

DETAILED DESCRIPTION OF THE INVENTION

Figure 1:
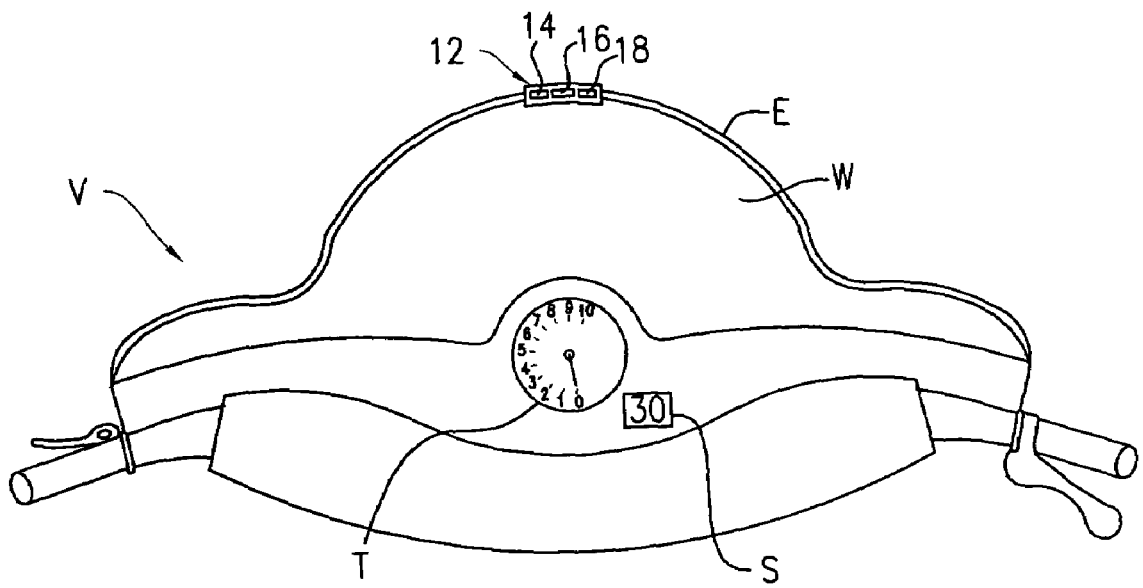
FIG. 1 is perspective view of the front portion of a snowmobile viewed from the operator's perspective looking out the front windshield on which is mounted a speed indicator in accordance with an embodiment of the present invention.
Figure 2:
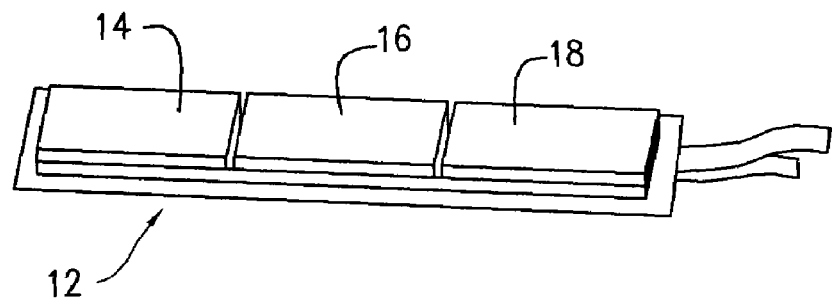
FIG. 2 is a perspective view of a speed indicator in accordance with an embodiment of the present invention.

FIG. 1 shows a vehicle V, such as a snowmobile or an ATV as seen by an operator thereof. i.e., looking forward, out the front windshield W. The snowmobile V has a tachometer T and a speedometer S. In the vehicle V shown, the tachometer T has a dial indicator and the speedometer S has a digital (numeral) readout. The speedometer S may be utilized by the operator to determine the speed of the vehicle V over the terrain on which it is operated. The position of the speedometer S requires the operator to direct his sight down, away from the windshield W in order to determine the speed of the vehicle. As noted above, clear visualization of the speedometer S may also be impeded by movement and weather conditions. A speed indicator 12 in accordance with the present invention is attached to the edge E of the windshield W. Because the speed indicator 12 is positioned on the windshield, it is not necessary for the operator to look down in order to see it. In contrast, the operator may continue to look up and in a forward direction to maintain a view of the terrain and simultaneously view the speed indicator 12. The speed indicator 12 is an array of three illuminable/extinguishable display elements 14, 16, 18, each preferably displaying a different colored light, e.g., green, yellow and red. The display elements 14, 16, 18 are preferably LEDs (light emitting diodes), but could also be conventional incandescent lights with different colored bulbs and/or lenses. Alternatively, the lenses may bear words, numbers or symbols, such as, "CAUTION", "DANGER", "SLOW DOWN", etc. The speed indicator 12 may be attached to the windshield W in any of a number of conventional methods, such as by adhesives, clamps, threaded fasteners, etc. Alternatively, the speed indicator 12 can be integrally molded into the windshield or into a trim piece for covering the edge E of the windshield W. The illumination of the display elements 14, 16, 18 may be used as a means of communicating information to the operator concerning the speed of the vehicle and, in addition, the degree of safety/risk associated with operating the vehicle at a given speed. For example, six different speed ranges could be encoded and indicated by the indicator 12 as follows: (a) no element (14, 16, 18) lit=0 to 30 MPH (miles per hour); (b) element 14 lit green color=30 to 40 MPH; (c) element 16 lit yellow=40 to 50 MPH; (d) element 18 lit red=50 to 60 MPH; (e) elements 14, 16, 18 lit green, yellow and red, respectively, simultaneously=60 to 70 MPH; (f) elements 14, 16, 18 flashing green, yellow, red, respectively, simultaneously=over 70 MPH. In this example, the illuminable elements are displayed in readily comprehensible, intuitive patterns of illuminated and non-illuminated (extinguished) elements. The given color patterns have a familiar meaning to drivers in that they analogize to traffic light signals with similar meaning. Further, the lighting of additional elements generates a more intense optical signal which would be appropriate for sending a stronger alert. The flashing of the display elements 14, 16, 18 is analogous to the common use of flashing lights to warn of danger. Accordingly, the speed indicator 12 functions to apprise the operator of a vehicle of a speed range but in addition communicates a message to the operator concerning the degree of safety/risk of operating the vehicle at the driven speed. As described further below, this safety/risk message may be adjusted based upon factors other than speed alone, e.g., based upon operator skill or operating conditions attributable to environmental factors, such as weather or trail usage density (congestion).

Figure 3:
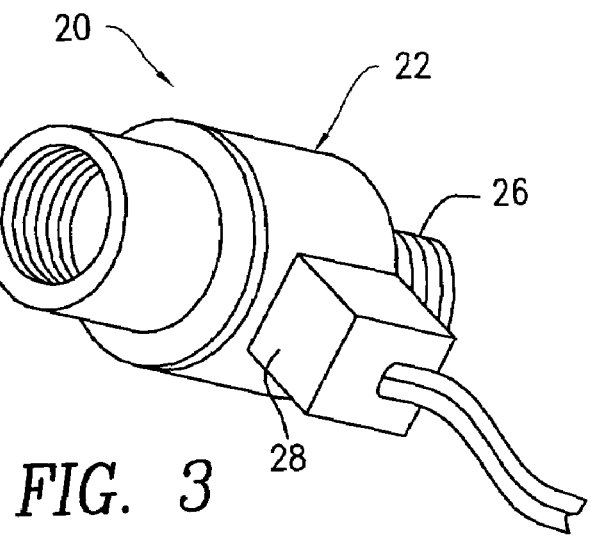
FIG. 3 is a perspective view of a speed sensor in accordance with an embodiment of the present invention.
Figure 4:
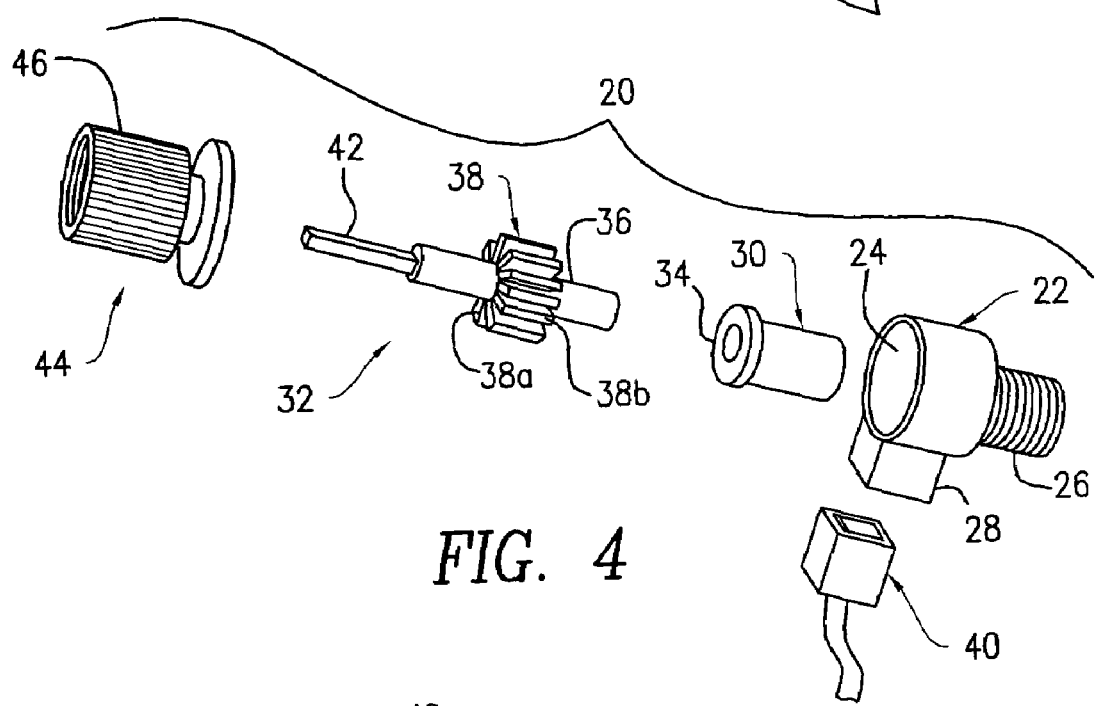
FIG. 4 is an exploded view of the speed sensor of FIG. 3.

FIGS. 3 and 4 show a sensor assembly 20 that may be retrofitted to an existing speedometer, more particularly, a cable driven speedometer for generating an electrical signal indicative of the instantaneous speed of the vehicle. Sensor assembly 20 has a housing 22 with a hollow 24, a threaded nipple 26 and a sensor socket 28. A bushing 30 inserts through the hollow 24 and into nipple 26 to receive and support a trigger unit 32 in bore 34, such that the trigger unit 32 rotates freely in bore 34. The trigger unit 32 has a cable receiver 36 with an interior hollow having a shape approximating that of the end of the speedometer cable of the vehicle in which it is installed, typically, a speedometer cable end (not shown) has a square cross-sectional shape. The trigger unit 32 has a rotor element 38 with a plurality of trigger teeth 38a, 38b, to trigger a pulse in a Hall effect sensor 40 inserted into sensor socket 28. A cable simulator/shaft 42 mimics the shape of the end of the speedometer cable of the vehicle in which the sensor assembly 20 is installed and is used to transfer the rotation of the speedometer cable to the speedometer when the sensor assembly 20 is installed on the vehicle. The trigger unit 32 is captured in the housing 22 by a cap unit 44, one end of which is crimped, welded, glued, threadedly attached or otherwise affixed to the housing 22 and the other end of which has a threaded rotatable sleeve 46 that screws onto the speedometer of the vehicle. As a result, the present invention extracts speed information from the existing speedometer cable without interrupting its functionality relative to driving the stock speedometer. This allows the present invention to be easily retrofitted and removed from a vehicle without destroying or interfering with the vehicle's original functionality. In lieu of the above described sensor unit 20, a Hall effect sensor of this type could be driven off the drive train of a vehicle or any driven element, e.g., off the chain or driveshaft final drive of a motorcycle or driven by the tread of a snowmobile. Furthermore, the speed signal input may be extracted from the speedometer signal of vehicles having electronic speedometers.

Figure 5:
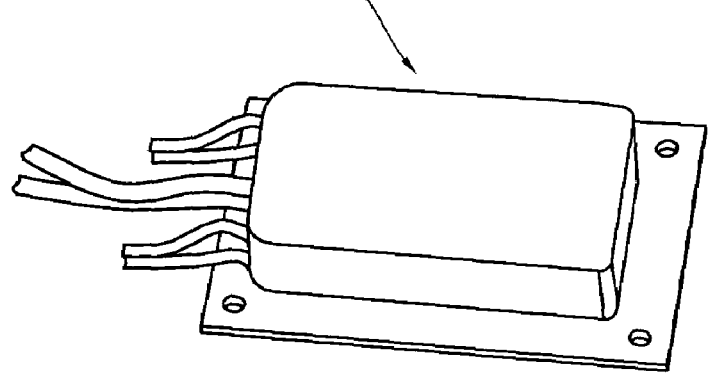
FIG. 5 is a perspective view of an electronic control unit in accordance with an embodiment of the present invention.

FIG. 5 shows a control unit 48 containing the electronic circuitry required to interpret the pulses from the sensor unit 20 and output commands to the display unit 12. For example, the control unit 48 may be used to count the pulses received over a given time period, thereby determining the frequency of pulses from which the rotational speed of the sensor and the associated speed of the vehicle may be calculated and the appropriate display element(s) 14, 16, 18 illuminated. In a preferred embodiment of the invention, the control unit is programmable, such that the speed ranges associated with specific display illumination patterns may be changed. For example, for novice riders, the speed ranges corresponding to low (safe), medium (heightened vigilance required) and high (extra vigilance warranted), etc. would be lower than the corresponding speed ranges for experienced and expert riders. This capacity to reset/program the control unit 48 may be implemented by conventional digital input devices, such as switches or keypads or by analog devices, such as variable capacitors, rheostats, etc. A photosensor, e.g., photoresistor (See FIG. 6) may be employed to provide an input to the control unit 48 to control the intensity of the display (illumination brightness) based upon the ambient lighting conditions, viz., the brighter the ambient light, the brighter the display needs to be in order to be readily observable.

The control unit 48 may be provided with an output to an engine control computer or to a throttle control solenoid on the carburetor or fuel injector of the vehicle for controlling the speed of the vehicle and thereby acting as a governor. This feature would be especially useful for vehicles that are rented to persons of unknown expertise or that are used by children or those with limited expertise. Even those who are expert operators may benefit from use of a governor feature of the present invention, in that they may not be familiar with the specific trail that they are riding on.

Figure 6:
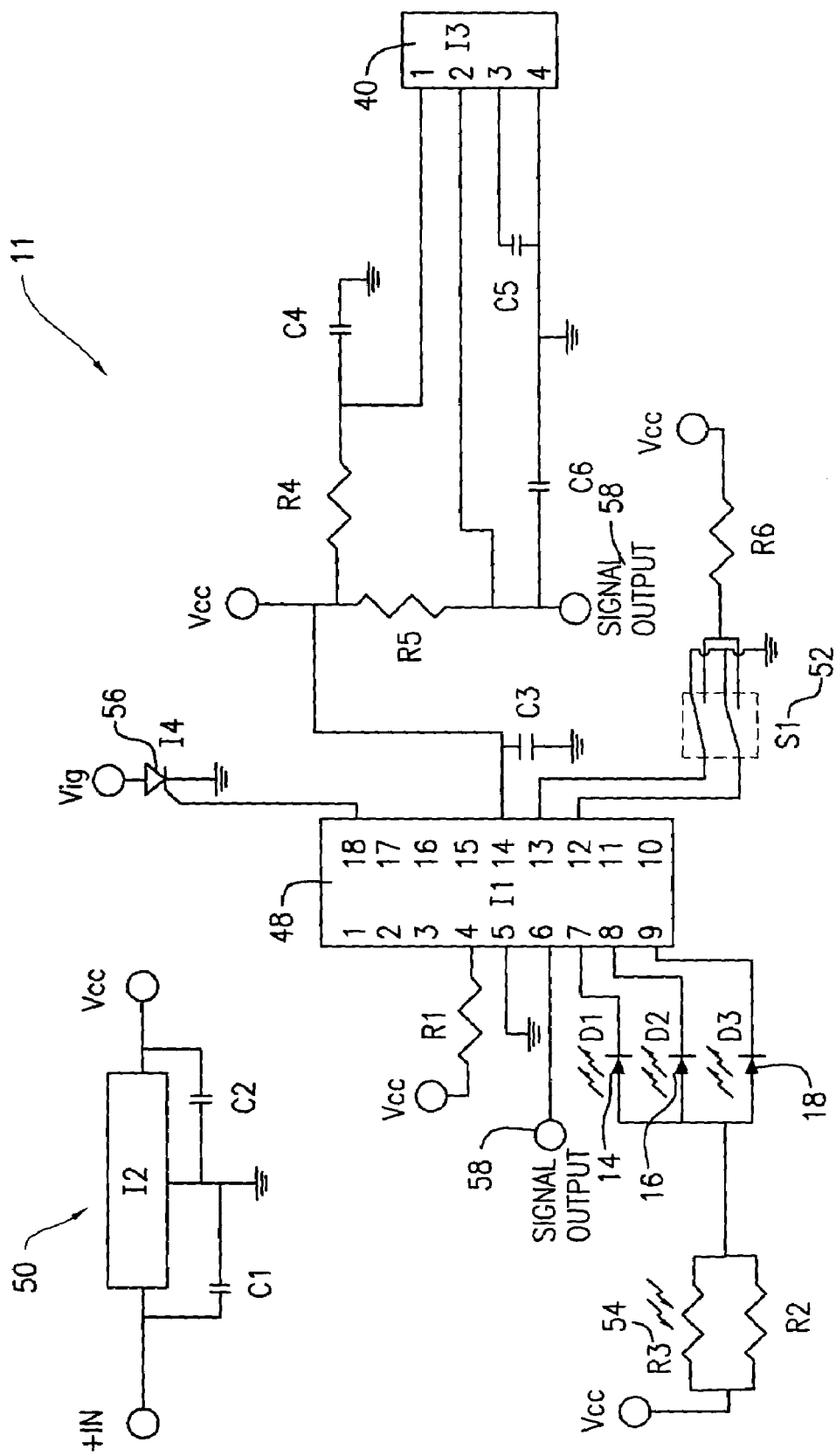
FIG. 6 is a schematic diagram of the circuit components of an exemplary embodiment of the present invention.

FIG. 6 shows an exemplary circuit 11 having a programmable integrated circuit (control unit) 48, for example, standard electrical component number PIC16F627 which receives signal output 58 (at pin number 6) generated by the Hall effect sensor 40. A voltage regulator 50, e.g., standard electrical component 78(L)05, +5 Volt, allows the circuit 11 to be powered by any typical vehicle voltage system, for example, 6, 12 or 24 volts (from 6 to 36 volts) and can be connected to the vehicle wiring, preferably in a fused line controlled by the ignition switch. The output of the voltage regulator 50, namely $V_{cc}$, is used to power the Hall effect sensor 40 through a voltage drop provided by resistor R4. The voltage signal powering Hall effect sensor 40 is filtered by capacitor C4 to smooth spikes in voltage. Capacitor C5 and C6 provide similar filtering functions for the output signal present on pin 2 of the Hall effect sensor 40. A dip switch 52 provides four combined voltage states corresponding to logical states 00, 01, 10 and 11 at pins 12 and 13. This can be utilized to encode the user's level of expertise ranging from novice to expert. For example, 00 may indicate expert with novice being 11. The switch 52 would typically be marked with the settings in a descriptive format or with a number coding. The integrated circuit 48 is programmed to count the pulses of the output signal 58 which are indicative of the revolutions of the speedometer cable and therefore the speed of the vehicle. The programming logic compares the pulse count (indicating revolutions per minute and speed) to predetermined threshold levels to ascertain the present speed range to illuminate the appropriate diode D1, D2, D3 element(s) 14, 16 and 18, which indicate to the driver the speed range of the vehicle, as described above. A photo resistor 54 modulates the voltage drop experienced by the light emitting diodes 14, 16, 18. Namely, as the light diminishes, the resistance increases such that the LED's are dimmed. Accordingly, the brighter the ambient lighting, for example during midday, the brighter the LED's must be in order to be visible. Conversely, the lower the ambient light, the dimmer the LED's 14, 16, 18 need to be so as not to "blind" or distract the driver with an unnecessarily bright light.

The programmable integrated circuit 48 has an output 56 at pin 18 for controlling a governor circuit. Preferably, the governor acts directly upon the vehicle's ignition system to pulse the ignition on and off, thereby diminishing the number of power cycles when vehicle speed is excessive. For example, for a novice user, the program may determine that a speed in excess of 30 miles per hour should trigger the governor to begin pulsing the ignition at 31 miles per hour. This pulsation of the ignition reduces the number of power pulses executed by the engine of the vehicle and thereby reduces the speed to at or below 30 miles per hour. A spark control mechanism for controlling the speed of the vehicle is preferred over a mechanism controlling throttle position via a solenoid or other electro-mechanical control which regulates throttle position, in that the throttle position utilized for maintaining a speed below the threshold overspeed, for example 30 miles per hour, will vary depending upon the specific power demands experienced by the vehicle. For example, in climbing a hill, the throttle will have a more advanced position than for level travel. Accordingly, a governor acting on throttle position will not regulate the speed of the vehicle as effectively in varying power demand situations.

In accordance with another aspect of the present invention, a trail marking system may be employed wherein signage or display lights are shown on the trail that correspond to "speed limits" or suggested safe speeds for riding on the trail at that particular time and in the specific weather conditions then prevalent. These trail markers or signs may express the "speed limit" in terms of the patterns utilized by the speed indicator 12, e.g., a green trail marker light could be used to indicate that operators should not exceed the speed range associated with the illumination pattern of a green display element 14 on their speed indicator. Note that a green trail marker light may result in a different "speed limit" in accordance with the present invention due to differences in operator expertise or weather conditions.

In yet another embodiment of the present invention, the control unit may be programmed to illuminate the display 12 based upon the geographic position of the vehicle as determined by a global positioning device. This implies that the present invention includes or communicates with a global positioning device/receiver which can provide this geographic information and has a memory for storing the data associated with all pertinent geographic locations, e.g., in a lookup table. In this manner, the "speed limits" associated with specific portions of a trail or landscape can be interactively and instantaneously determined based upon where on the trail or landscape the vehicle is located. As noted above, the present invention may be utilized as a governor by providing an output signal corresponding to the "speed limit" to an engine management computer or to the controls associated with conventional governor devices, such as a cruise control system.

In accordance with yet another embodiment of the present invention, the display 12 may be remotely controlled by the controller 48 by means of a wireless connection. In that case, on-board power, such as a battery, is required for powering the speed indicator 12. In this manner, a wireless speed indicator 12 may be affixed to a windshield without the necessity of wires running from the unit which may adversely obscure the view through the windshield, present a potential entanglement hazard and/or an unsightly appearance. Alternatively, a wireless display unit 12 could be affixed to the inside or outside of the face shield of a helmet or somewhere else on the helmet within the ready viewing field of the user of the vehicle.

Figure 7:
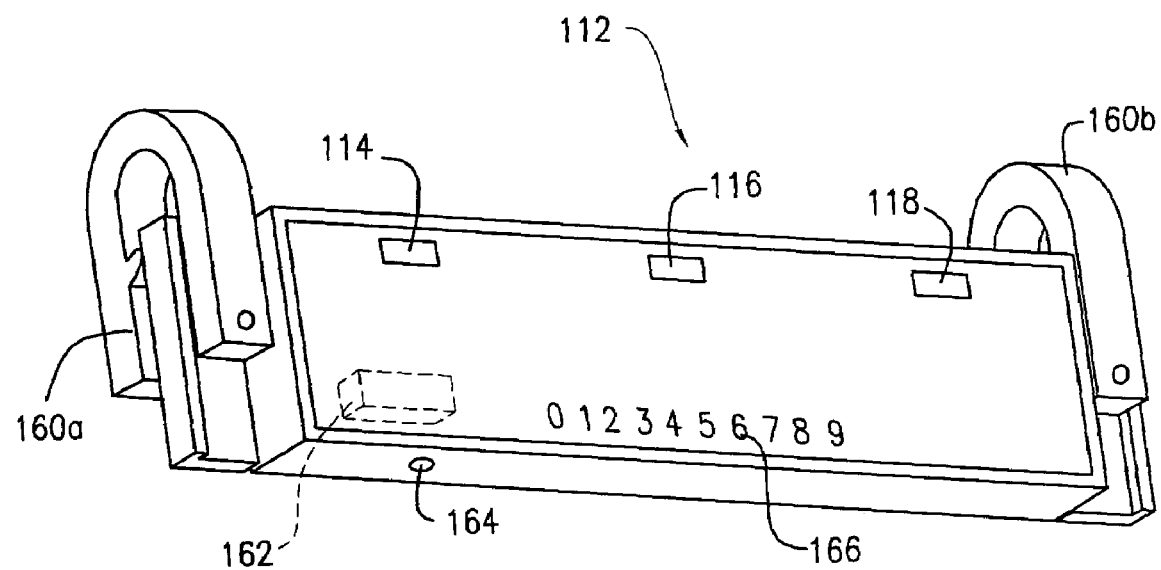
FIG. 7 is a perspective view of an alternative embodiment of the present invention.

FIG. 7. shows a speed indicator 112 in accordance with another embodiment of the present invention. The speed indicator 112 has an array of three display elements 114, 116 and 118, each preferably displaying a different colored light, such as LEDs or incandescent lights with colored lenses. The speed indicator 112 may be attached to an edge of vehicle body, windshield or helmet visor (windscreen) by clips 160a, 160b. As noted above, speed indicator 112 may be connected to a control unit, such as control unit 48 shown in FIGS. 5 and 6, with the control unit 48 illuminating the display elements 114, 116, 118 in accordance with a predetermined convention for conveying the degree of safety of operation in various speed ranges, potentially as affected by operator skill setting or environmental factors impacting safety of operation of the vehicle. The speed indicator 112 illustrates a tamper-resistant interface for entering data pertaining to external factors, such as operator skill level, weather, etc., viz, via a switch 162 actuable through access hole 164. When a slender pin such as a paper clip wire or needle is inserted through access hole 164 and the switch 162 momentarily depressed, one of several levels of added risk factors (on a scale of 0 through 9) corresponding cumulatively to the increase in risk owing to driver inexperience, adverse weather conditions, trail congestion, etc. may be selected. A numerical display 166 has a plurality of illuminable numbers (0-9) that indicate which level of added risk factor(s) has been chosen. The level of added risk factor chosen is communicated to control unit 48 which uses it to select the display element(s) 114, 116, 118 to illuminate for a given speed. For example, if an expert rider and perfect environmental conditions correspond to an added risk factor of 0, then the speed range of 0 to 20 m.p.h. could result in a green element 114 being displayed. If icy conditions exist, the added risk factor might rise to level 3 resulting in a green element 114 being illuminated in a speed range of 0 to 5 m.p.h., a yellow element 116 being illuminated in the range of 6 to 8 m.p.h., and a red element 118 being illuminated in the range of 19 to 25 m.p.h.

Figure 8:
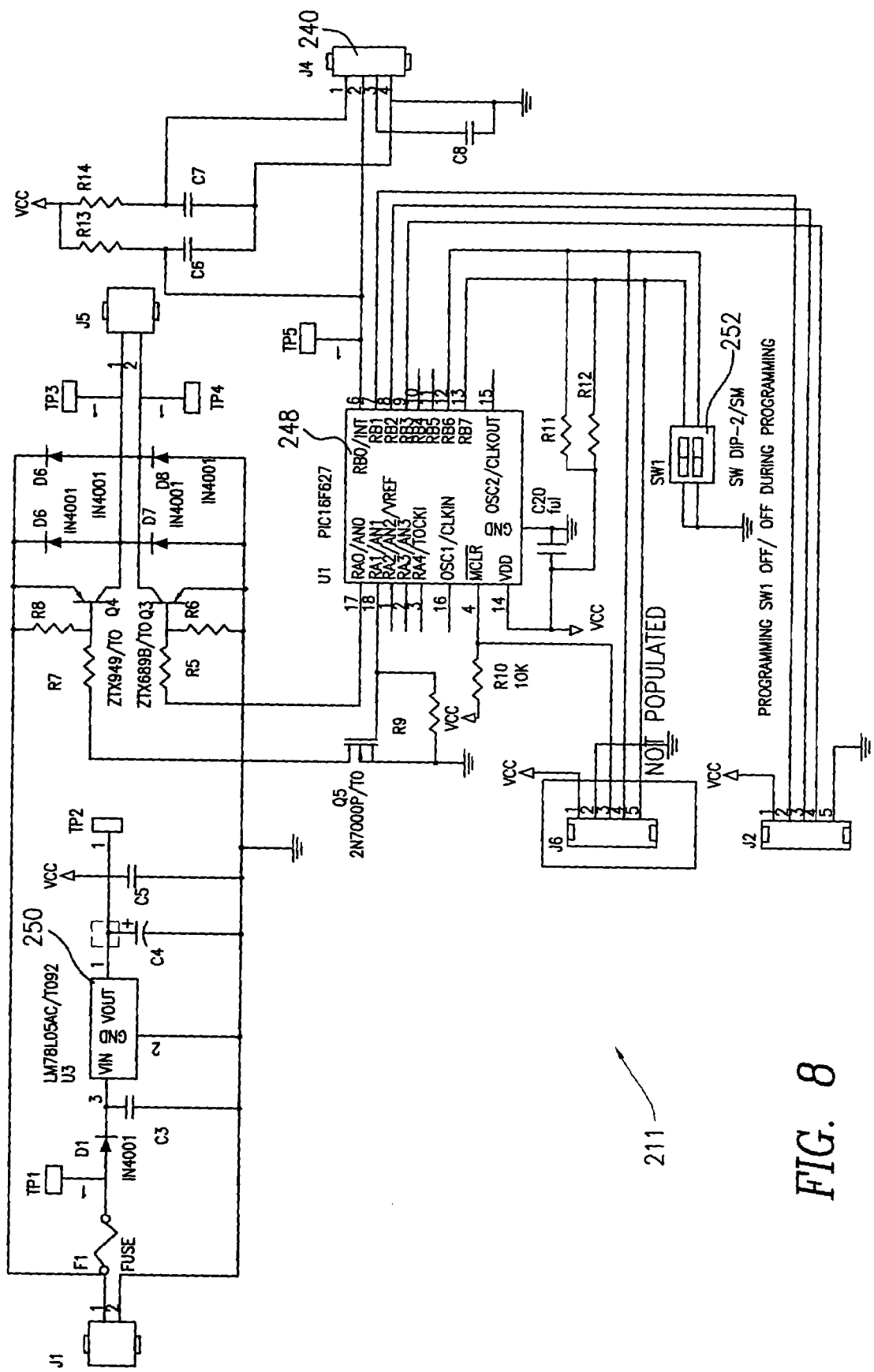
FIGS. 8 and 9 are schematic diagrams illustrating another exemplary embodiment of the present invention.
Figure 9:
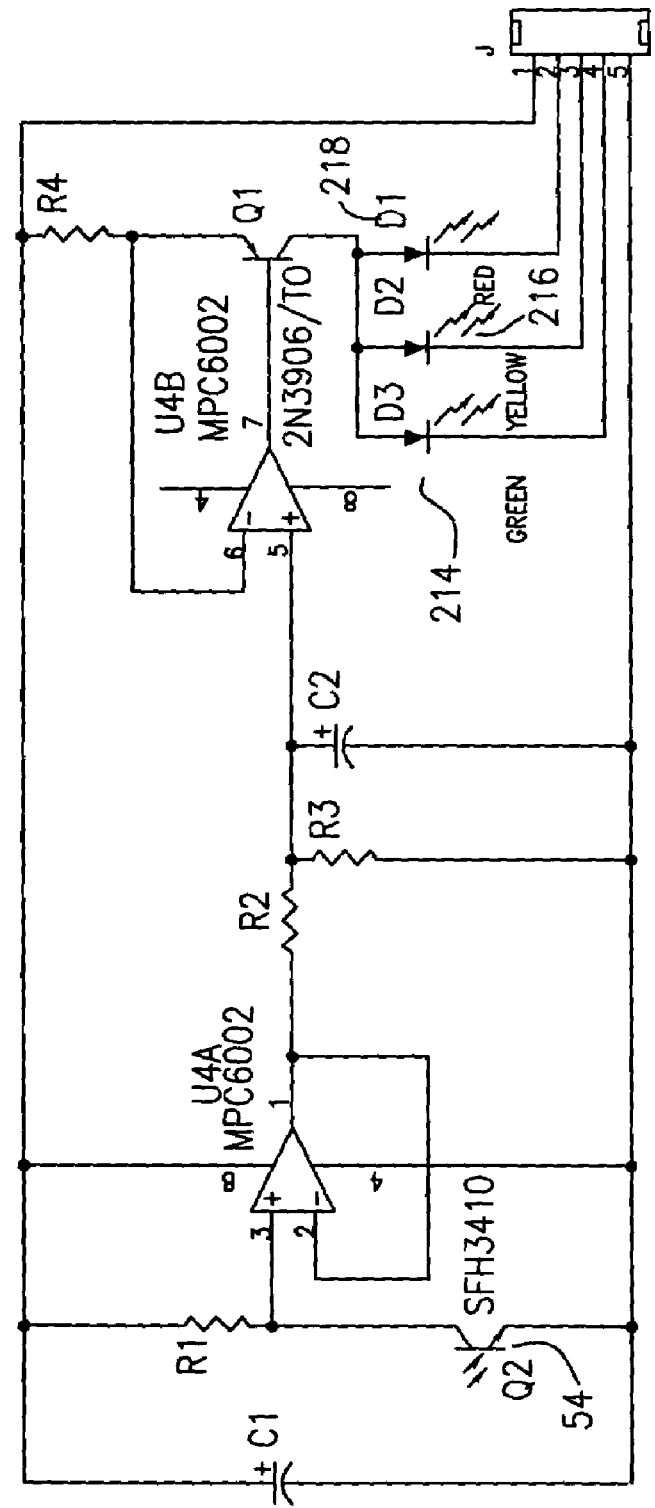

FIGS. 8 and 9 show an alternative circuit for implementing the invention where the reference numbers for like elements shown in FIG. 6 are incremented by 200.

It should be understood that the embodiments described herein are merely exemplary and that a person skilled in the art may make many variations and modifications without departing from the spirit and scope of the invention. For example, the present invention has been described above in reference to small, personal vehicles, such as snowmobiles and jet skis. It could also be used on boats, trucks and military vehicles. Further, while a visual output signal has been described, the present system could readily incorporate an audio signal, e.g., with different frequency ranges indicative of speed and/or prerecorded digital messages being announced, e.g., "Please reduce your speed—you are traveling in excess of 50 miles per hour." All such variations and modifications are intended to be included within the scope of the present invention.

We claim:

1. A visual indicator and control system for apprising an operator of a vehicle of the level of risk associated with operating the vehicle at a plurality of different speeds, comprising:
   a plurality of illuminable elements illuminable in a plurality of patterns, said patterns having a predetermined correlation to safety of operation at a given vehicle speed;
   a speed sensor coupled to a driven element of the vehicle, said speed sensor sensing upon the motion of said driven element and generating said signal indicative of vehicle speed; and
   a control circuit that receives said signal indicative of vehicle speed, selects an illumination pattern from said plurality of illumination patterns based upon said signal indicative of vehicle speed and outputs an illumination signal for illuminating said plurality of illuminable elements in one of said plurality of illuminable patterns to indicate the degree of safety of operation of the vehicle at the present speed, said control circuit being programmable to variably associate selected speed ranges of the vehicle with ones of said plurality of patterns indicating safety of operation based upon at least one of operator expertise and environmental conditions, said visual indicator receiving a signal indicative of vehicle speed and displaying one of said plurality of illuminable patterns in response to the signal, said visual indicator positionable proximate to the operator's line of sight while the operator is operating the vehicle and being visible to the operator when the operator is looking at a spatial position towards which the vehicle is traveling.

2. The visual indicator of claim 1, wherein said control circuit has an output acting as a governor controlling power output of an engine driving the vehicle to control the speed of the vehicle, such that the operator does not exceed a predetermined level of risk.

3. The visual indicator of claim 2, wherein said control circuit output for controlling power output affects the sparking rate of an internal combustion engine.

4. The visual indicator of claim 2, wherein the said control circuit is programmable to select a particular speed limit for the vehicle based upon at least one of operator expertise and environmental conditions.

5. The visual indicator of claim 1, wherein the signal indicative of vehicle speed is a stock electronic input to a stock electronic speedometer.

6. A speed sensing display and control system for apprising an operator of the risk of operating a vehicle at various speeds; comprising:
   a risk indicator display with a plurality of illuminable elements illuminable in a plurality of patterns, each of said plurality of patterns having a predetermined correlation to vehicle speed, said plurality of patterns being implemented by at least one of extinguishing an element of one color and illuminating an element of another color to indicate a change in risk associated with a change in speed, successively illuminating additional elements to indicate a change in risk, and flashing at least one element to indicate that the vehicle has attained a particular level of risk associated with operation of the vehicle at a given speed;
   a speed sensor coupled to a driven element of the vehicle, said speed sensor sensing upon the motion of said driven element and generating a signal indicative of vehicle speed;
   a control unit that receives said signal indicative of vehicle speed, selects an illumination pattern from said plurality of illumination patterns based upon said signal indicative of vehicle speed and outputs an illumination signal for illuminating said plurality of illuminable elements in one of said plurality of illuminable patterns to indicate risk of operation at the speed then applicable to the operator, said risk indicator display being positionable proximate to the operator's line of sight while the operator is operating the vehicle and being visible to the operator when the operator is looking at a spatial position towards which the vehicle is traveling; and
   a plurality of signs posted in the environment through which the vehicle travels, each of said plurality of signs having a speed risk advisory visible thereon to apprise an operator of a vehicle as to an appropriate risk level for the vehicle in the vicinity of the sign, said sign expressing the speed risk advisory in terms of one of said illumination patterns to allow comparison between the pattern shown on the sign and the pattern displayed on said risk indicator display.

7. The system of claim 6, wherein said control unit is programmable to allow inputting a selected skill level for the operator, said control unit assigning said illumination patterns indicating risk of operation at given speed ranges based upon the skill level input.

8. A method for controlling the speed of a vehicle, comprising:
   storing a plurality of speed limits associated with a plurality of geographic positions in a computer-accessible memory;
   ascertaining the geographic position of the vehicle using a GPS receiver;
   accessing the speed limit for the geographic position of the vehicle with a
   computer by looking up the speed limit for the applicable geographic position in the memory;
   sensing the speed of a vehicle with a speed sensor;
   comparing the actual speed of the vehicle to the ascertained speed limit;

if the actual speed of the vehicle exceeds the ascertained speed limit, then reducing engine power output until the speed of the vehicle is less than or equal to the ascertained speed limit.

9. The method of claim 8, wherein the speed limits for each of the plurality of geographic positions include values associated with at least one of the operator expertise and environmental factors and further including the step of entering data into the computer pertaining to at least one of the operator expertise and environmental factors before said step of ascertaining, the computer finding the applicable speed limit based upon geographic position and at least one of operator expertise and environmental conditions during said step of ascertaining.

* * * * *